Figure 2:
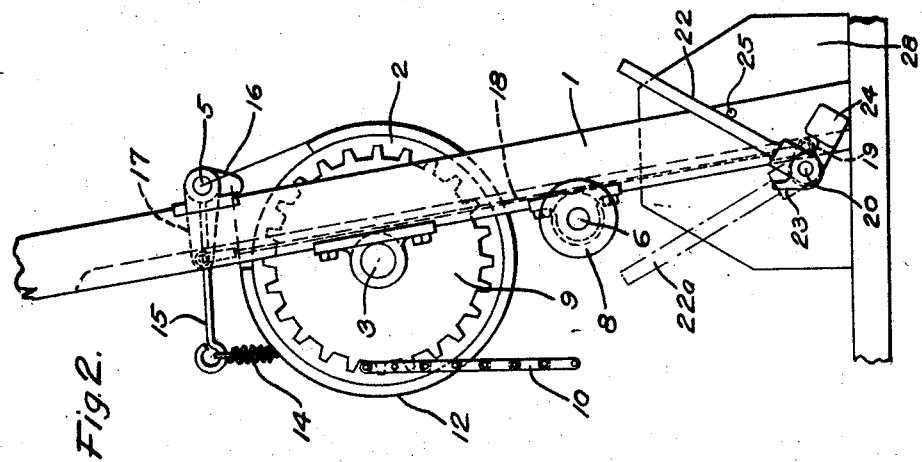

Oct. 27, 1925.

F. W. HILD 1,558,876

BRAKING SYSTEM FOR ELECTRIC EARTH BORING MACHINES

Filed July 28, 1923   2 Sheets-Sheet 1

WITNESSES:

INVENTOR
Frederic W. Hild.
BY
ATTORNEY

Oct. 27, 1925.  
F. W. HILD  
1,558,876  
BRAKING SYSTEM FOR ELECTRIC EARTH BORING MACHINES  
Filed July 28, 1923 2 Sheets-Sheet 2
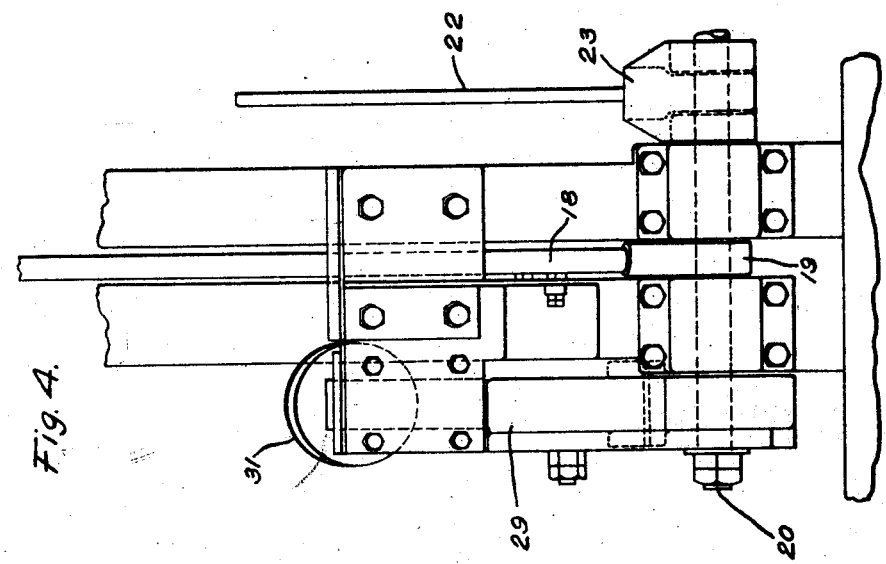
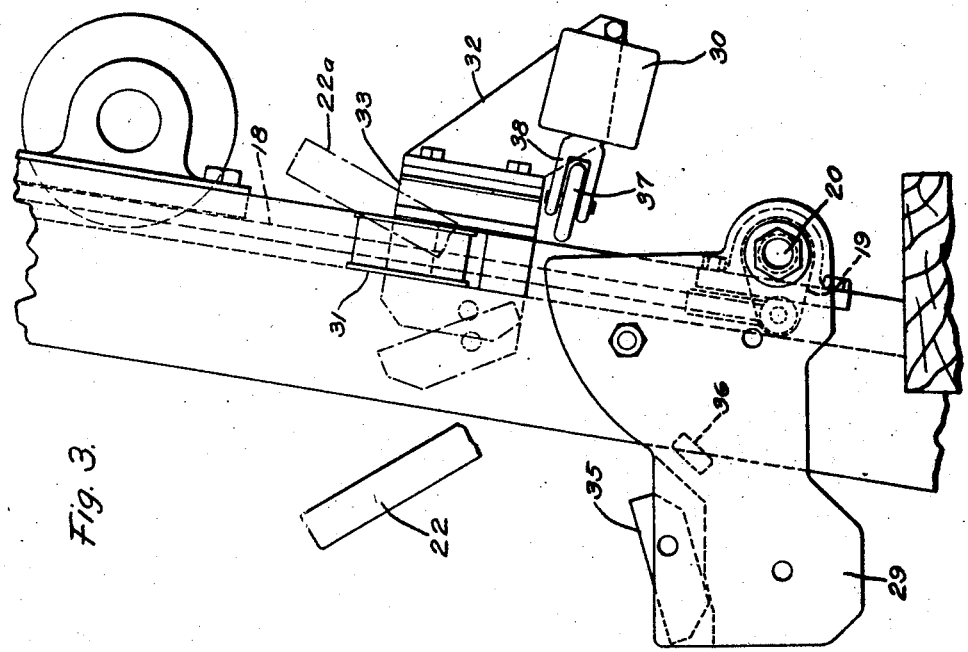
WITNESSES:
INVENTOR
Frederic W. Hild.
BY
ATTORNEY Patented Oct. 27, 1925.

1,558,876

UNITED STATES PATENT OFFICE.

FREDERIC W. HILD, OF LOS ANGELES, CALIFORNIA.

BRAKING SYSTEM FOR ELECTRIC EARTH-BORING MACHINES.

Application filed July 28, 1923. Serial No. 654,303.

*To all whom it may concern:*

Be it known that I, FREDERIC W. HILD, a citizen of the United States, and a resident of Los Angeles, in the county of Los Angeles and State of California, have invented a new and useful Improvement in Braking Systems for Electric Earth-Boring Machines, of which the following is a specification.

My invention relates to brake mechanisms, more especially to brake members associated with hoisting drums or the like that are employed in earth boring operations.

It is among the objects of my invention to provide a brake member which is semi-automatic in its function and which is operated and controlled by either manual, gravity-actuated or electro-magnetic means, which co-ordinate to perform the various functions of actuating and maintaining the brake mechanism in its various operating positions.

It is a further object of my invention to provide a device of the above designated character which shall be of simple, compact and durable mechanical construction, which shall be efficient in its function of controlling a hoist or drum in accordance with the requirements of earth boring mechanism or the like and which shall insure absolute safety for the operator.

Heretofore the brake mechanism for earth boring machinery consisted of a brake band associated with the flanges of the hoist drum which was controllable by a hand operated lever, and its effective capacity depended largely upon the strength and weight of the operator. Such a brake member required constant manipulation, was of limited capacity, and somewhat uncertain because the load to be braked might at times exceed the weight and leverage which the operator could apply.

My present invention is directed to a braking device that is designed to overcome these difficulties by providing positive and reliable braking means that is mechanically controlled, thereby obviating the need of constant attention by the operator. The brake control mechanism is arranged in such manner as to make the application of the brake independent of the manipulation of the control lever thereby insuring safety and certainty of operation.

The brake is adapted to be held in its operating position by a weight which is connected by a system of links, levers and shafts to the brake band and the weight is so connected as to apply the load on the brake independent of the forces exerted on the operating lever. When the brake is released, the weight is positioned to be effective in relieving the tension from the brake band and an electromagnet is further provided to hold the weight in this inoperative position. The linkage is provided with contact members which are arranged to operate a switch to automatically energize the coil of the magnet at a predetermined position of the linkage that will assure the most efficient use of the magnet. The brake engagement is effected through the weight member thereby taking the load from the operating lever.

Figure 1:
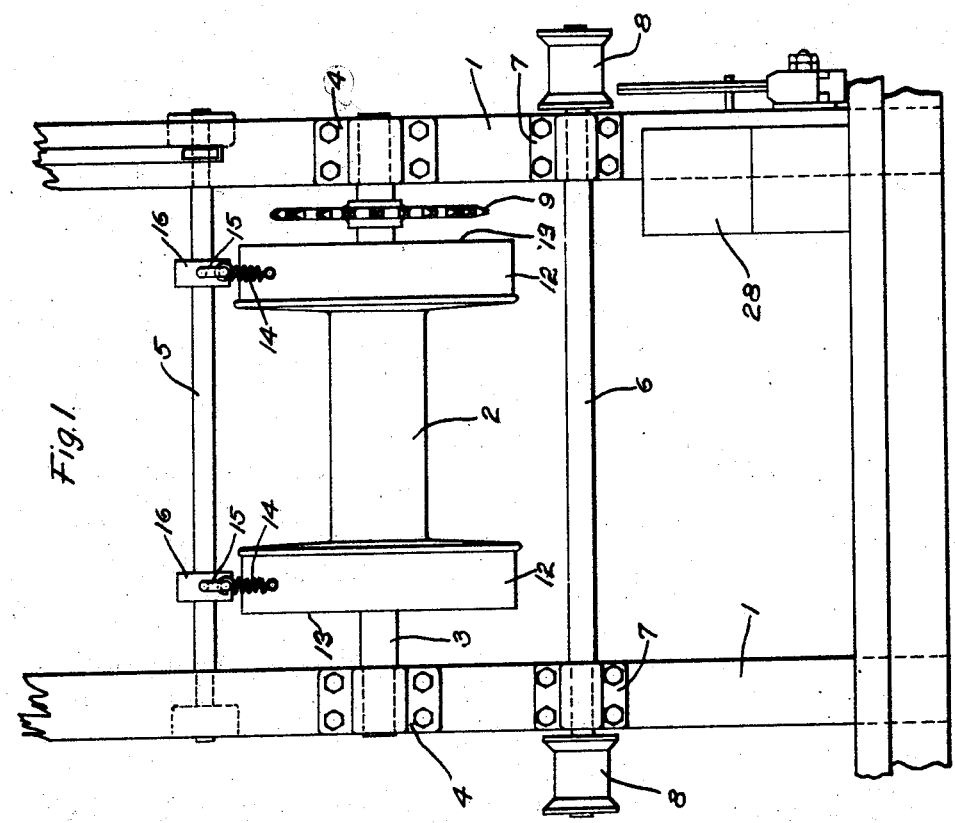

In the accompanying drawings constituting a part hereof and in which like reference characters designate like parts, Figure 1 is a side elevational view of a drum rigging such as is commonly employed in earth boring operations, Fig. 2 is an end elevational view thereof, Fig. 3 is a fragmentary portion of a derrick post as shown in Fig. 2 with the counterweight and holding mechanism mounted thereon, and Fig. 4 is a corresponding end elevational view thereof.

Referring to Figs. 1 and 2, the device comprises a plurality of vertical struts or supports 1 provided with a hoist drum 2 and shaft 3 which is journaled in suitable bearing brackets 4 secured to the struts 1. A brake shaft 5 is mounted on the struts 1 in alinement with the drum 2. A winch shaft 6, journaled in suitable bearing brackets 7, is secured to the members 1 in alinement with the drum 2 and is provided at its outer extremities with "cat heads" or small drums 8. The drum shaft 3 is provided with a sprocket gear 9 which is driven by a chain 10 connected to a driving gear (not shown).

Referring to Fig. 2, a plurality of brake bands 12 are disposed around the flanges 13 of the drum 2 and are yieldingly secured at one end by tension springs 14 that are connected by hanger straps 15 to the brake shaft 5. The other end of the brake band 12 is connected to the brake shaft 5 by crank levers 16. A crank 17 is mounted on the shaft 5 and is connected by a link 18 to a crank 19 secured to a stud shaft 20 pivotally mounted on the support 1. An operating lever 22 is keyed or otherwise secured to the shaft 20 and a clevis 23, provided with a counter-weight 24, is secured on the shaft 20 in such a manner as to cooperatively engage the lever 22.

A stop pin 25 is provided on the support 1 as a rest or stop for the lever 22. A casing 28 encloses a counter-weight 29, a switch 30 and an electromagnet 31, Figs. 3 and 4, at the foot of the support 1. The weight 29 is mounted on the shaft 20 and the switch 30 and the magnet 31 are secured to the support by an angle plate 32 and mounting bracket 33. The weight 29 is provided with an adjustable contact member 35 adapted to aline itself with the contact surface of the magnet 31 and a cam 36 is provided on the weight 29 to engage a roller member 37 pivotally mounted in a switch arm 38 for actuating the switch 30.

The operation of the device is briefly as follows: The brake band 12 engages the drum flange 13 by disposing the counter-weight 29 in the position illustrated in Fig. 3, which is accomplished independently of the lever 22, by actuating the link 18 to operate the brake shaft 5 through the crank 17 to draw up the bands 12. To release the brake tension on the drum the lever 22 is manipulated to the position 22a illustrated in Figs. 2 and 3 thereby raising the weight 29 by pivoting it on the shaft 20 to bring the contact member 35 in engagement with the magnet 31. While traversing this arc, the cam 36 strikes the roller 37 of the switch-arm 38 which energizes the magnet 31 shortly before contact is made by the member 35. This action prevents the heavy rush of current in the alternating current magnet by reducing the air gap. The hand lever 22 then automatically returns to the positions 22 shown on Figs. 2 and 3 by reason of the gravity effect of counter-weight 24 on clevis 23 actuating on lever 22.

The function of the brake bands is such as to free them for most of their circumference when the levers move to release the brake. The action of the springs 14 prevents sagging of the bands when the brake is released.

The arrangement of the electromagnet and the electric switch is novel in brakes of this type, as are the co-operating parts. The clevis and counter-weight provided on the hand lever assures safety to the operator and effects a return of the lever to the stop position when released by the operator. If the weight should for any reason drop from the open position to the closed position of the brakes, the hand lever would not be affected and would not move.

It will be obvious to those skilled in the art that various modifications may be made in the details of construction without departing from the principles herein set forth and that a brake mechanism such as I have described is applicable to other uses.

I claim as my invention:—

1. A brake mechanism comprising a surface band adapted to engage a drum, a shaft for actuating said band, an operating shaft having a hand lever connected therewith, a balance weight mounted thereon and a holding magnet for said weight, said brake actuating shaft and said operating shaft being operatively connected by a plurality of cranks and a link.

2. A brake mechanism comprising a surface band, means for actuating said band, means for holding said band in its operative position and electromagnetic means for maintaining said holding means inoperative.

3. A brake mechanism comprising gravity tension means for a brake band, manual control means for operating said tension means and electromagnetic means for rendering said tension means inoperative.

4. A brake mechanism comprising a drum having a plurality of brake bands mounted thereon, a shaft connected to said bands, actuating means for said shaft comprising a weight and a hand lever, and an electric switch and a holding magnet associated with said weight and lever.

5. A brake mechanism comprising a brake drum and a plurality of friction bands, means for releasing said bands from the drum and a gravity-actuated weight for engaging said bands with the said drum.

6. A brake mechanism comprising a plurality of brake drums and friction bands, means for releasing said bands from the drums, a gravity-actuated weight for engaging said bands with said drums, electromagnetic means for holding said weight in its inoperative position and automatic means for energizing said magnet.

7. A brake mechanism comprising a plurality of brake drums and friction bands, means for releasing said bands from the drums, a gravity-actuated weight for engaging said bands with said drums, electromagnetic means for holding said weight in its inoperative position, and automatic means for de-energizing said magnet and releasing said weight into operative position.

8. A brake mechanism comprising a plurality of brake drums and friction bands, means for releasing said bands from the drums, a gravity-actuated weight for engaging said bands with said drums, electromagnetic means for holding said weight in its inoperative position, an electric switch for energizing said magnet and automatic means for actuating said switch.

9. A brake mechanism comprising a brake drum and friction band, a hand lever for engaging said band with said drum, means independent of said lever for applying and maintaining tension on said band, and means for automatically moving said hand lever out of engagement with said tension applying means.

In testimony whereof, I have hereunto subscribed my name this 9th day of July 1923.

FREDERIC W. HILD.